US012627090B2

(12) United States Patent
Nojima

(10) Patent No.: US 12,627,090 B2
(45) Date of Patent: May 12, 2026

(54) CONNECTOR PACKAGES FOR FASTENERLESS CIRCUIT COUPLING

(71) Applicant: Eaton Intelligent Power Limited, Dublin (IE)

(72) Inventor: Geraldo Nojima, Matthews, NC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 766 days.

(21) Appl. No.: 17/964,360

(22) Filed: Oct. 12, 2022

(65) Prior Publication Data

US 2023/0116532 A1 Apr. 13, 2023

Related U.S. Application Data

(60) Provisional application No. 63/338,248, filed on May 4, 2022, provisional application No. 63/255,106, filed on Oct. 13, 2021.

(51) Int. Cl.
*H01R 13/20* (2006.01)
*H01R 4/48* (2006.01)
*H01R 13/187* (2006.01)

(52) U.S. Cl.
CPC ............... *H01R 13/20* (2013.01); *H01R 4/48* (2013.01); *H01R 13/187* (2013.01)

(58) Field of Classification Search
CPC ........ H01R 13/20; H01R 4/48; H01R 13/187; H05K 7/14329; H01L 23/04; H01L 23/08;

(Continued)

(56) References Cited

U.S. PATENT DOCUMENTS 4,614,964 A * 9/1986 Sutrina .................. H01L 25/10 257/691
5,439,398 A * 8/1995 Testa ........................ H01R 4/38 411/237

(Continued)

FOREIGN PATENT DOCUMENTS

DE 102014115812 A1 5/2016
EP 2148557 A2 1/2010

(Continued)

OTHER PUBLICATIONS

International Seach Report and Written Opinion issued in International Application No. PCT/EP2022/025472, mailed Mar. 31, 2023, 18 pages.

*Primary Examiner* — Jacob R Crum
(74) *Attorney, Agent, or Firm* — Talem IP Law, LLP

(57) ABSTRACT

A system for high-voltage interconnecting and interfacing can include: a package for a circuit, wherein the package comprises a housing for the circuit; and a gate connector located centrally on a face of an exterior surface of the housing, wherein the gate connector enables wiring outside the package to couple to the gate connector from any of a plurality of directions. In certain embodiments, the package for the housing further comprises a pressure applicator about an exterior surface of the housing; and the system further comprises a leadline that extends from the circuit within the housing and beyond the exterior surface through an aperture in the housing, wherein the leadline can be deformed over the pressure applicator at the exterior surface such that the pressure applicator can apply pressure to the leadline against a contact surface of a second structure.

18 Claims, 5 Drawing Sheets

(58) Field of Classification Search
CPC ............. H01L 23/367; H01L 23/49517; H01L 2924/17151; H01L 2924/172
See application file for complete search history.

(56) References Cited

U.S. PATENT DOCUMENTS

| | | | | |
|---|---|---|---|---|
| 5,521,437 | A * | 5/1996 | Oshima .................. | H05K 1/142 257/E23.172 |
| 9,418,975 | B1 | 8/2016 | Yoneyama et al. | |
| 2005/0280490 | A1 | 12/2005 | Uchiyama et al. | |
| 2006/0154527 | A1 | 7/2006 | Kroneder et al. | |
| 2007/0236889 | A1 * | 10/2007 | Ma ........................ | H01L 23/367 361/715 |
| 2021/0305126 | A1 * | 9/2021 | Naeve ..................... | H01L 25/50 |

FOREIGN PATENT DOCUMENTS

| | | | |
|---|---|---|---|
| EP | 2665095 | A1 | 11/2013 |
| JP | S61218152 | A | 9/1986 |

* cited by examiner

CONNECTOR PACKAGES FOR FASTENERLESS CIRCUIT COUPLING

STATEMENT REGARDING FEDERALLY SPONSORED RESEARCH OR DEVELOPMENT

This invention was made with Government support under contract no. DE-EE0009135 awarded by DOE. The Government has certain rights in this invention.

BACKGROUND

In power electronics, voltages are transformed by converter circuits, which are then coupled to other components through busses or other interconnecting or interfacing structures. Traditionally, silicon-based semiconductors have been used heavily in such converter circuits; however, wide-bandgap semiconductors are seeing increasing use in converter circuits due to their many superior physical traits, including operation in a wider range of temperatures, voltages, and frequencies. In combination, this leads to faster, more efficient designs that are able to perform in more compact architectures.

To cope with the faster wide-bandgap semiconductor transistors, such as silicon carbide MOSFET, a converter circuit has to have significantly reduced parasitic components (e.g., components that introduce inductance and capacitance)—by at least ten times. State-of-the-art interconnecting structures rely on bolts, nuts, and screws for connecting to packages. Insertion of bolts and nuts causes loss of power density due to required dimensional allowances for electric insulation and for their mechanical placement. Moreover, use of large-sized bolts, nuts, and screws forces the package housing design to align semiconductor switch power terminals, which causes further dimensional increases when arranging the conducting plates of the interconnecting structure. These dimensional increases cause the parasitic components to increase and also reduce the semiconductor switch performance.

BRIEF SUMMARY

Connector packages for fastenerless circuit coupling are provided. Rather than connecting a terminal using holes and corresponding screws or nuts, the terminal can connect by direct contact and pressure to the interconnecting or interfacing structure. Packages without the need of fasteners not only provide compact, lower parasitic architecture but also allow the underlying circuitry to have more flexibility in geometry and terminal location as compared to fastener-based packaging. The described connector package configurations allow for the whole package to be rotatable to fit different wire/package connection configurations.

A system for high-voltage interconnecting and interfacing can include: a package for a circuit, wherein the package includes a housing for the circuit and a pressure applicator about an exterior surface of the housing; and a leadline that extends from the circuit within the housing and beyond the exterior surface through an aperture in the housing, wherein the leadline can be deformed over the pressure applicator at the exterior surface such that the pressure applicator can apply pressure to the leadline against a contact surface of a second structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Connector packages for fastenerless circuit coupling are provided. Rather than connecting a terminal using holes and corresponding screws or nuts, the terminal can connect by direct contact and pressure to the interconnecting or interfacing structure. Packages without the need of fasteners not only provide compact, lower parasitic architecture but also allow the underlying circuitry to have more flexibility in geometry and terminal location as compared to fastener-based packaging. The described connector package configurations allow for the whole package to be rotatable to fit different wire/package connection configurations.

The described connector package can connect to an interconnecting or interfacing structure directly via compression (e.g., without the use of fasteners such as nuts, bolts, and screws). This feature affords a housing for the package freedom to use any geometry and for the power and control terminals to be anywhere within an enclosure, with no alignment requirements nor limit on the number of terminals for a given switch. These factors give the package the optimum framework to reduce parasitic components, balance transmission line effects amongst the switch die population on both the power connections, as well as the control connections such as the gate and kelvin terminals. Indeed, it is possible for the whole package to be rotatable to fit different wire/package connection configurations.

Advantageously, it is possible to reduce overall circuit parasitic components—potentially by an order of magnitude or more. Furthermore, the described package enables placement of terminals on both sides of an interconnecting or interfacing structure while today's solutions only allow for single-side placement. Consequently, not only are the parasitic components reduced by a factor of ten, but unprecedented power density can also be achieved.

The described package is suitable for technologies incorporating wide bandgap silicon carbide and gallium nitride as well as faster ultra-wide bandgap diamond semiconductor switches. In some cases, the described package is suitable for high-voltage interconnecting and interfacing in the voltage range of 0.6 kV to 60 kV. Accordingly, "high-voltage" as used herein refers to voltages at or above 600V.

Figure 1A:
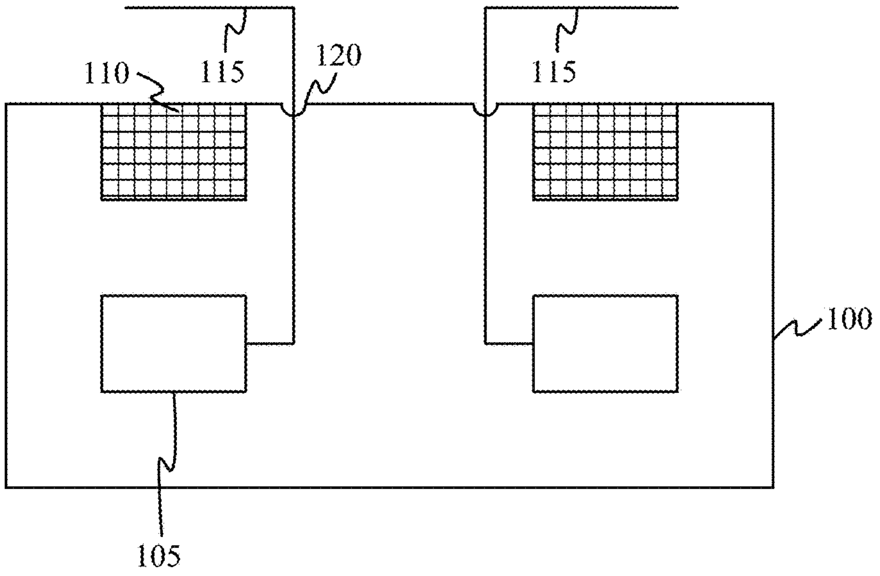
FIGS. 1A and 1B illustrate a system for high-voltage interconnecting and interfacing.
Figure 1B:
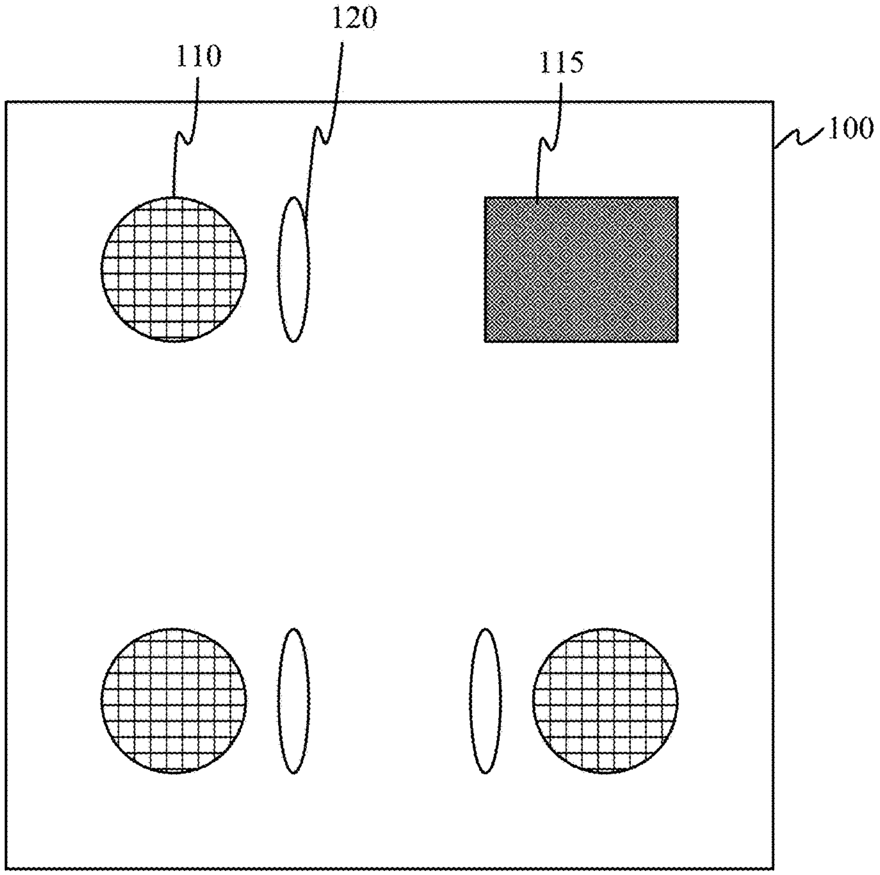

FIGS. 1A and 1B illustrate a system for high-voltage interconnecting and interfacing. FIG. 1A illustrates a side view that showcases how leadlines are situated. FIG. 1B illustrates a top view that shows positioning of pressure applicators as well as leadlines. Turning to FIG. 1A, a system for high-voltage interconnecting and interfacing can include a package for a circuit 105. The package can include a housing 100 for the circuit 105 and a pressure applicator

Figure 2:
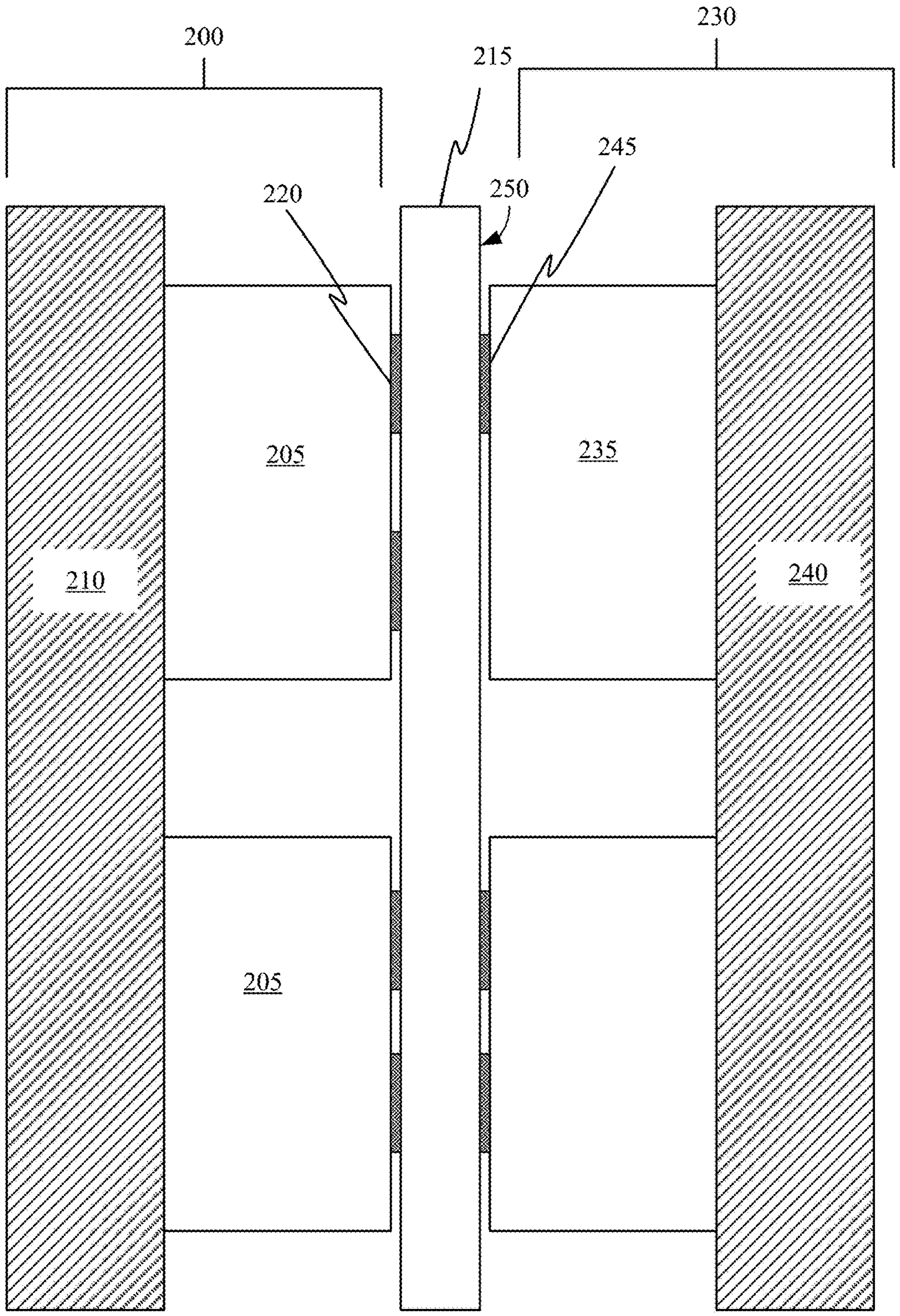
FIG. 2 illustrates a system of two assemblies sandwiching a busline interface.

110 about an exterior surface of the housing 100. The package can further include a leadline 115 that extends from the circuit 105 within the housing 100 and beyond the exterior surface through an aperture 120 in the housing 100, wherein the leadline 115 can be deformed over the pressure applicator 110 at the exterior surface such that the pressure applicator 110 can apply pressure to the leadline 115 against a contact surface of a second structure, such as a busline interface as seen in FIG. 2. The circuit 105 can be a power electronics circuit, including a power electronics circuit including a wide bandgap transistor. The leadline 115 can be a connection between the circuit and any outside elements, for example the second structure. The leadline 115 can be, for example, a wire, and can include an insulative coating for some part of the leadline 115. The leadline 115 can also include a leadline package outside of the housing that can be at least partially made of a more durable material to prevent damage to the leadline 115 when acted upon by the pressure applicator 110.

Turning to FIG. 1B, there can be at least one pressure applicator 110 spaced throughout an exterior surface of the housing 100. The pressure applicators 110 can, for example, be spaced evenly throughout the exterior surface. Four pressure applicators 110 can be seen, but either fewer pressure applicators or more pressure applicators can be used. The one or more pressure applicators 110 can be placed proximal to corresponding apertures 120 that allow a leadline 115 to extend through the surface of the housing 100. In FIG. 1B, only one of the leadlines is shown deformed over the pressure applicator 110 as seen at the right side in FIG. 1A.

FIG. 2 illustrates a system of two assemblies sandwiching a busline interface. Referring to FIG. 2, an assembly 200 can be formed of a plurality of packages 205. Each package can be configured such as described with respect to FIGS. 1A and 1B, as an example. The assembly can further include a heat sink 210. The heat sink 210 may be formed of individual heat sinks for each package; or a larger heat sink to which multiple packages of the assembly are coupled. The assembly 200 is coupled to a busline interface 215. The busline interface can be used to couple one or more circuits (e.g., housed in a package 205) with an external bus or system. Accordingly, the leadlines 220 of the packages 205 make physical and electrical contact with a contact surface of a second structure in the form of conductive pads on the busline interface 215 due to the pressure applied by the corresponding pressure applicators at the exterior surface of the package housing against the leadlines 220 deformed thereover. Since the leadlines 220 can be connected to the busline interface 215 through mechanical pressure applied by the pressure applicators, rather than using screw and bolt, it is possible for the whole package to be rotatable to fit different wire/package connection configurations.

A second assembly 230 formed of at least a second package 235 can face the first assembly 200, sandwiching the busline interface 215 between the two assemblies. The second assembly 230 can be identical or similar to the first assembly 200, for example by including a second package 235 and a heat sink 240. The second package 235 can be configured such as described with respect to FIGS. 1A and 1B. For example, the second package 235 can include a second housing for a second circuit, a second pressure applicator about an exterior surface of the second housing, and a second leadline 245 that extends from the second circuit within the second housing and beyond the exterior surface through a second aperture in the second housing, wherein the second leadline 245 is deformed over the second pressure applicator at the exterior surface such that the second pressure applicator can apply pressure to the second leadline 245 against the second contact surface 250 of the busline interface 215 (where the second contact surface is the opposite facing surface of the busline interface 215 as that contacted by the first assembly 200).

Figure 3B:
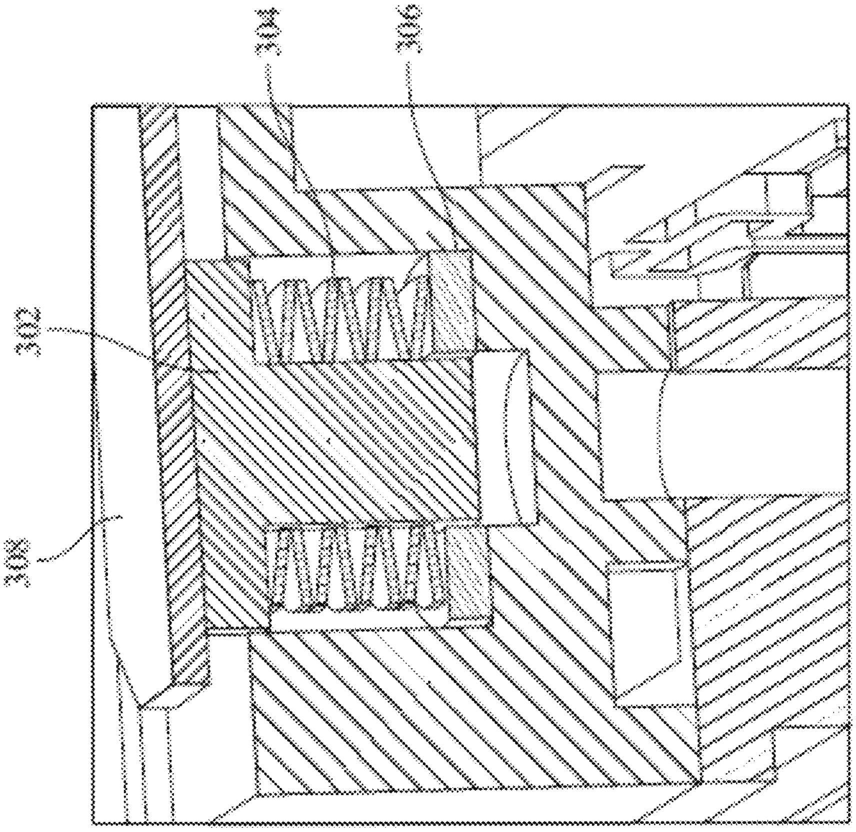
FIGS. 3A and 3B illustrate an example pressure applicator for a system for high-voltage interconnecting and interfacing.
Figure 3A:
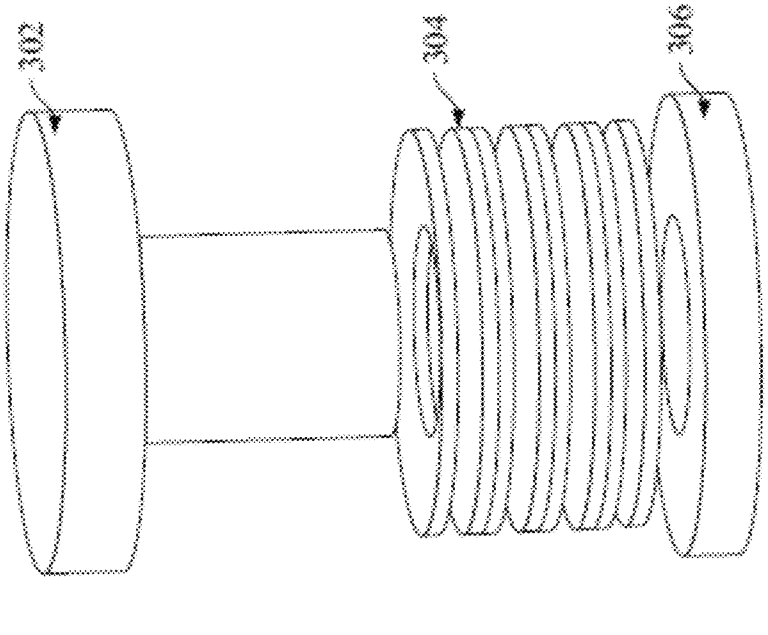

FIGS. 3A and 3B illustrate an example pressure applicator for a system for high-voltage interconnecting and interfacing. FIG. 3A illustrates a view of the pressure applicator independent of the system and the housing. The pressure applicator can include an insert 302 of some variety, an apparatus 304 for storing potential energy, and a base 306. The insert 302 can include a wider circumference at one end for better enabling contact. The insert 302 can be made of a variety of materials including conductive materials such as brass as well as nonconductive materials. The apparatus 304 for storing potential energy can be a variety of different types of apparatus, for example a stack of Belleville washers, as seen in the Figure. Other spring systems or pneumatic systems can potentially be used. The base 306 can be used to brace the pressure applicator against the housing or better maintain the potential energy by providing a hard surface that doesn't allow give and thus degrade the energy stored. Turning to FIG. 3B, a cross-sectional view of the pressure applicator housed in a support for the pressure applicator within the housing can be seen. A leadline 308 can be deformed over the pressure applicator and consequently receive pressure from the pressure applicator as discussed with respect to FIGS. 1A and 1B.

Figure 4B:
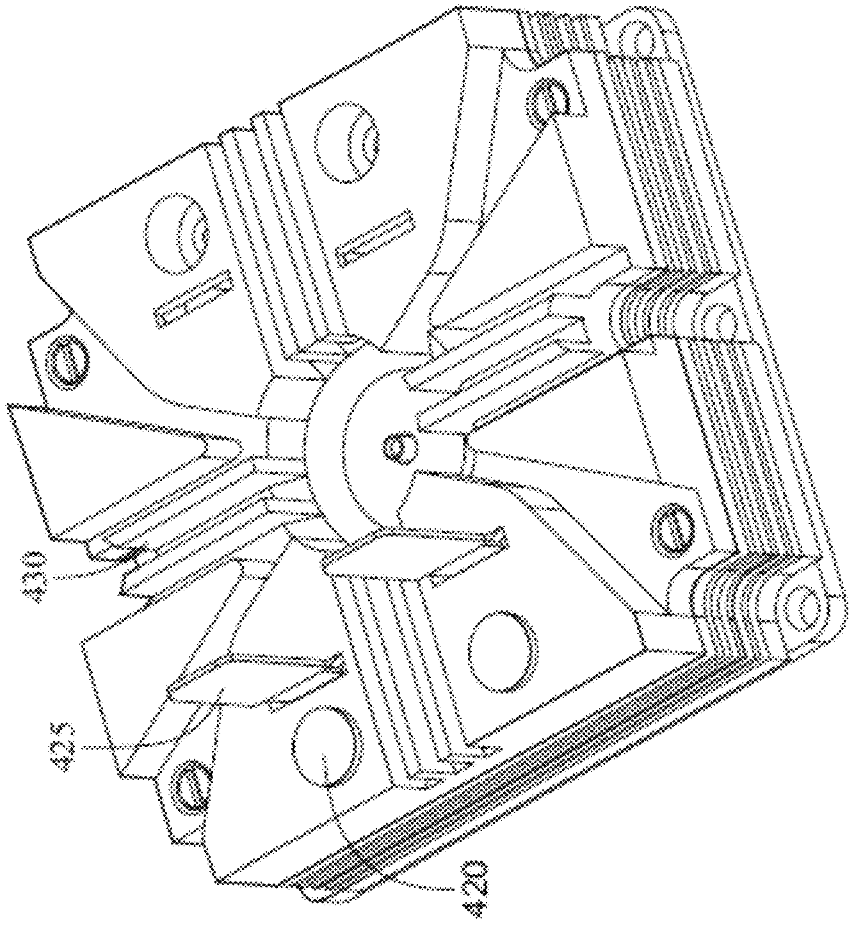
FIGS. 4A and 4B illustrate an example housing of a package.
Figure 4A:
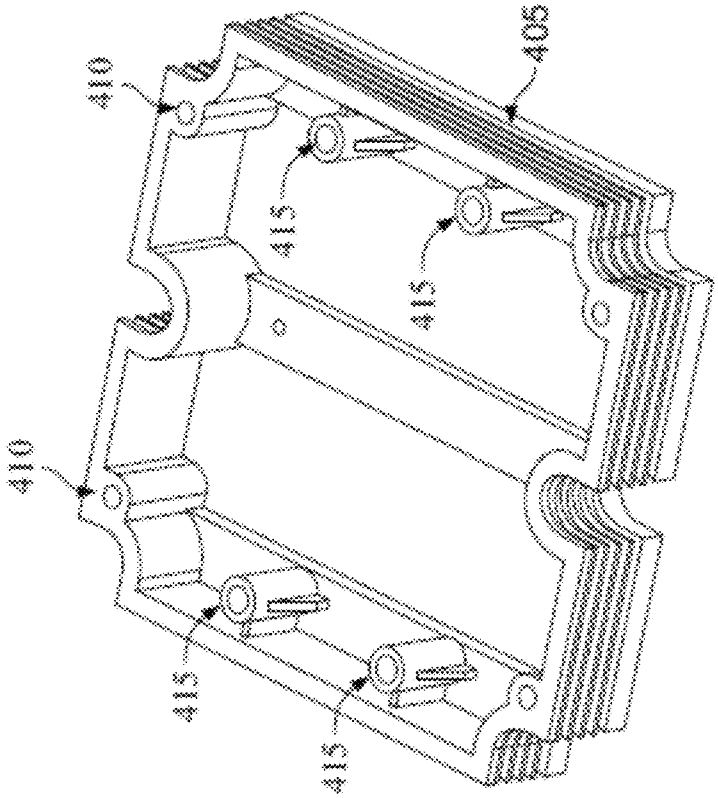

FIGS. 4A and 4B illustrate an example housing of a package. FIG. 4A illustrates a peripheral substructure of the housing, and FIG. 4B illustrates a completed housing. Turning to FIG. 4A, a peripheral substructure of the housing can include ribs 405, attachers 410, and supports 415 for pressure applicators. The housing can be at least partially composed out of an insulative material, such as Polyphenylene Sulfide resin.

The ribs 405 can allow for wire or other materials to be routed around the housing. The ribs 405 can also maximize creepage distance along the surface. Attachers 410 can allow the housing—and thus the entire package—to be affixed to another surface, for example a baseplate or lid. Affixing the housing can allow for further stabilization, access to additional heatsinks, or addition of modules, for example measuring tools. The attachers 410 can be, for example screw holes and corresponding screws. The supports 415 for pressure applicators can house pressure applicators and separate other internal parts of the package from the pressure applicating, ensuring clearance. The supports 415 can also increase the force exerted by the corresponding pressure applicators by providing a firm surface that remains rigid, ensuring maximal force is applied towards the exterior surface. Turning to FIG. 4B, a completed housing can be seen. Pressure applicators 420 and associated leadline 425 can be seen. The exterior surface can include divots and slits 430 to allow for further wiring. On a peripheral surface, laser marking can be used to label a particular system.

Figure 5B:
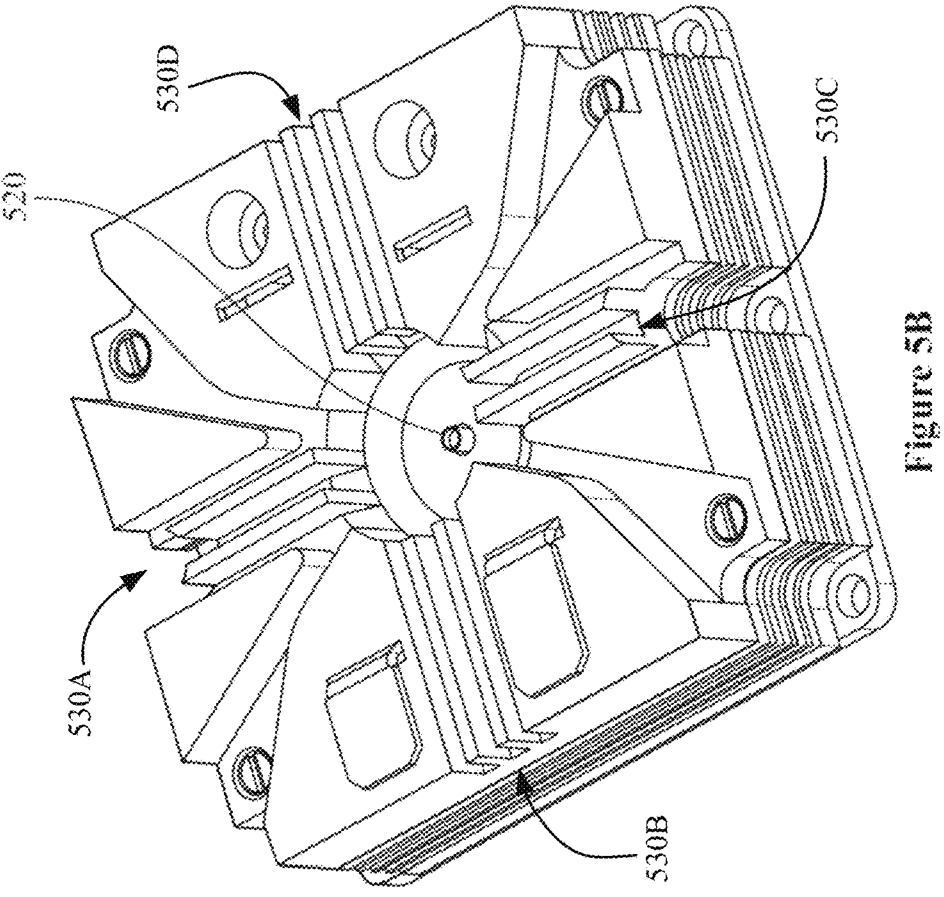
FIGS. 5A-5C illustrate a further embodiment of a package.
Figure 5A:
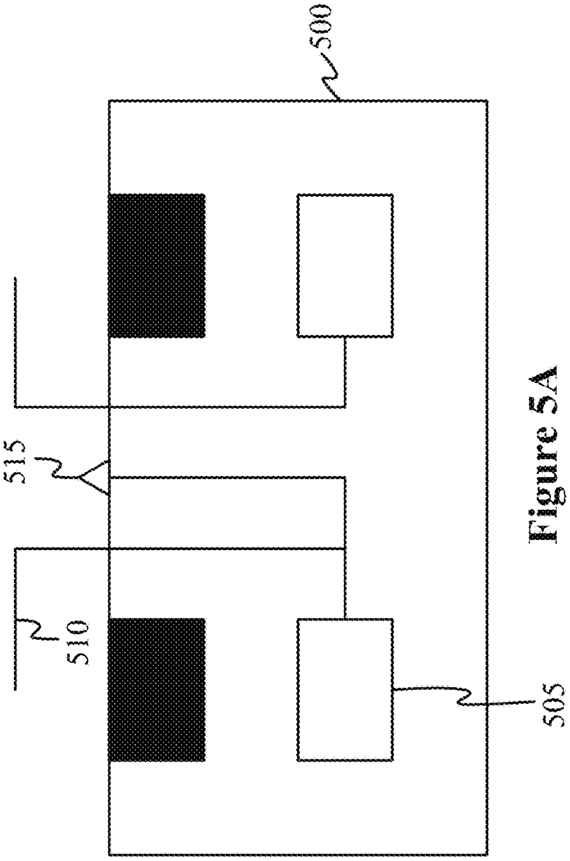
Figure 5C:
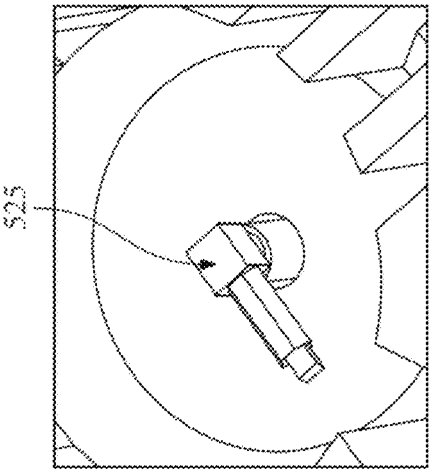

FIGS. 5A-5C illustrate a further embodiment of a package. Turning to FIG. 5A, a schematic view can be seen that shows how a gate connector can be added to the schematic seen in FIG. 1A. A circuit 505 within a package 500 can extend outside of the housing of the package 500 by means of a leadline 510 that extends through an aperture in the housing. However, the circuit 505 can also be coupled to internal wiring that is connected to a gate connector 515 that also serves as an aperture that allows the circuit 505 to be coupled outside of the package 500.

Turning to FIG. 5B, the gate connector 515 can be seen in a design of the package 500. The gate connector 515 may be a female gate connector 520 as seen in FIG. 5B. The gate connector 515 can be located centrally on a face of the package 500 and may be located on the same external surface as the pressure applicators. The package 500 can feature ribbing (e.g., ribs 405 of FIG. 4A) that allows wiring from outside the package to reach the gate connector 515 through a peripheral face, for example, from a plurality of directions. Turning to FIG. 5C, the gate connector 515 can alternatively be a male gate connector 525. The gate connector 515 can be rotatable. The female gate connector 520 can be configured to enable connection by a male connector/wiring from any of the directions, for example, by having a circular acceptor that does not require a particular orientation. The male gate connector 525 may rotate such that the "L" shape allows for connection in any direction (e.g., from the ribs on the surface).

Advantageously, by incorporating a gate connector 515 at a central location of the package 500, impedance distribution amongst the circuits (e.g., circuit 105) within the package housing can be optimized in a manner suitable for wide bandgap and ultra-wide bandgap circuits. In addition, the ribbing permits the gate connection to be accessible from any direction, which minimizes the length of that gate connection to its driving device. Further, the rotatability of the gate connector supports connection from the various directions. Indeed, as seen in FIG. 5B, the female gate connector 520 (or male gate connector 525 as seen in FIG. 5C) can be rotated to support connections from at least four directions 530A, 530B, 530C, and 530D. Moreover, the gate connector 515 (e.g., of female gate connector 520 and/or male gate connector 525) configurations can be applied to packages that do not include pressure applicator-based interconnections.

As mentioned above, the whole package is rotatable to fit different wire/package connection configurations. For example, as illustrated in FIGS. 1B and 5B, the package may have four applicators (each which may have a corresponding leadline) that are positioned symmetrically with respect to the center axis (e.g., the gate connector). If the package is rotated e.g., 90 degrees, the package can be easily connected to the busline interface just like before the rotation. The ability for the gate connector to rotate can support the ability of the package to be rotated.

In certain cases, a system for interconnecting and interfacing includes a package for a circuit and a gate connector located centrally on a face of an exterior surface of a housing. The package includes a housing for the circuit. The gate connector enables wiring outside the package to couple to the gate connector from any of a plurality of directions (e.g., four directions 530A, 530B, 530C, and 530D).

In some cases, the housing of any such cases includes ribs allowing wiring outside the package to reach the gate connector from the plurality of directions. In some cases, the gate connector of any of the above cases is rotatable. In some case, the gate connector of any of the above cases is L shaped. In some cases, the housing of any of the above cases includes ribs allowing wiring outside the package to reach the gate connector through a peripheral face.

In some cases, the package for the circuit of any of the above cases further includes a pressure applicator about the exterior surface of the housing and a leadline that extends from the circuit within the housing and beyond the exterior surface through an aperture in the housing; the leadline can be deformed over the pressure applicator at the exterior surface such that the pressure applicator can apply pressure to the leadline against a contact surface of a second structure. In some cases, the pressure applicator of any of the above cases is provided in plurality about the exterior surface of the housing and positioned symmetrically with respect to the rotatable gate connector. In some cases, the pressure applicator of any of the above cases includes a stack of Belleville washers.

In some cases, the second structure of any of the above cases is a busline interface. In some cases, the busline interface of any of the above cases includes the contact surface for contacting the leadline at one face and a second contact surface at an opposite face; and the system of any of the above cases further includes a second package for a second circuit and a second leadline that extends from the second circuit within the second housing and beyond the exterior surface through a second aperture in the second housing. The second package includes a second housing for the second circuit and a second pressure applicator about an exterior surface of the second housing. The second leadline can be deformed over the second pressure applicator at the exterior surface such that the second pressure applicator can apply pressure to the second leadline against the second contact surface of the busline interface.

In some cases, the circuit of any of the above cases is a power electronics circuit. In some cases, the power electronics circuit of any of the above cases includes a wide bandgap transistor. In some cases, the housing of any of the above cases includes an insulative material. In some cases, the insulative material of any of the above cases is Polyphenylene Sulfide resin. In some cases, the system of any of the above cases further includes a heat sink.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system for interconnecting and interfacing, the system comprising:

a package for a circuit, wherein the package comprises a housing for the circuit; and a gate connector located centrally on a recessed face of an exterior surface of the housing and configured to enable connection to a complementary connector and associated wiring from outside the housing, wherein the exterior surface of the housing includes slits in communication with the recessed face, wherein the slits are configured to receive the associated wiring of the complementary connector for the associated wiring to reach the gate connector from a plurality of directions.

2. The system of claim 1, wherein the gate connector has a circular acceptor and the complementary connector is rotatable with respect to the gate connector to enable connection of the complementary connector to the gate connector in any direction or orientation.

3. The system of claim 1, wherein the gate connector is L shaped.

4. The system of claim 1, wherein the housing comprises ribs allowing wiring outside the package to reach the gate connector through a peripheral face.

5. The system of claim 1, wherein the package for the circuit further comprises:

a pressure applicator about the exterior surface of the housing; and a leadline that extends from the circuit within the housing and beyond the exterior surface through an aperture in the housing, wherein the leadline can be deformed over the pressure applicator at the exterior surface such that the pressure applicator can apply pressure to the leadline against a contact surface of a second structure.

6. The system of claim 5, wherein the pressure applicator is provided in plurality about the exterior surface of the housing and positioned symmetrically with respect to the gate connector.

7. The system of claim 5, wherein the pressure applicator comprises a stack of Belleville washers.

8. The system of claim 5, wherein the second structure is a busline interface.

9. The system of claim 8, wherein the busline interface comprises the contact surface for contacting the leadline at one face and a second contact surface at an opposite face, the system further comprising:

a second package for a second circuit, wherein the second package comprises a second housing for the second circuit and a second pressure applicator about an exterior surface of the second housing; and a second leadline that extends from the second circuit within the second housing and beyond the exterior surface through a second aperture in the second housing, wherein the second leadline can be deformed over the second pressure applicator at the exterior surface such that the second pressure applicator can apply pressure to the second leadline against the second contact surface of the busline interface.

10. The system of claim 5, wherein the circuit is a power electronics circuit.

11. The system, of claim 10, wherein the power electronics circuit comprises a wide bandgap transistor.

12. The system of claim 1, wherein the housing comprises an insulative material.

13. The system of claim 12, wherein the insulative material is Polyphenylene Sulfide resin.

14. The system of claim 1, wherein the system further comprises a heat sink.

15. A system for interconnecting and interfacing, the system comprising:

a package for a circuit, wherein the package comprises a housing for the circuit and a pressure applicator about an exterior surface of the housing;

a leadline that extends from the circuit within the housing and beyond the exterior surface through an aperture in the housing, wherein the leadline can be deformed over the pressure applicator at the exterior surface such that the pressure applicator can apply pressure to the leadline against a contact surface of a second structure, wherein the second structure is a busline interface that comprises the contact surface for contacting the leadline at one face and a second contact surface at an opposite face;

a second package for a second circuit, wherein the second package comprises a second housing for the second circuit and a second pressure applicator about an exterior surface of the second housing; and a second leadline that extends from the second circuit within the second housing and beyond the exterior surface through a second aperture in the second housing, wherein the second leadline can be deformed over the second pressure applicator at the exterior surface such that the second pressure applicator can apply pressure to the second leadline against the second contact surface of the busline interface.

16. The system of claim 15, wherein the circuit is a power electronics circuit that comprises a wide bandgap transistor.

17. The system of claim 15, wherein the pressure applicator comprises a stack of Belleville washers.

18. The system of claim 15, wherein the system further comprises a heat sink.

* * * * *